US011100769B2

(12) United States Patent
Nötzel

(10) Patent No.: US 11,100,769 B2
(45) Date of Patent: Aug. 24, 2021

(54) DISPLAY APPARATUS FOR AN OPERATIONAL FORCE FOR DISPLAYING INFORMATION CONTENTS OF DIFFERENT INFORMATION TYPES OF A GUIDANCE SYSTEM

(71) Applicant: Rheinmetall Electronics GmbH, Bremen (DE)

(72) Inventor: Christian Nötzel, Bremen (DE)

(*) Notice: Subject to any disclaimer, the term of this patent is extended or adjusted under 35 U.S.C. 154(b) by 19 days.

(21) Appl. No.: 16/625,552

(22) PCT Filed: Jun. 27, 2018

(86) PCT No.: PCT/EP2018/067258
§ 371 (c)(1),
(2) Date: Dec. 20, 2019

(87) PCT Pub. No.: WO2019/002373
PCT Pub. Date: Jan. 3, 2019

(65) Prior Publication Data
US 2021/0097822 A1    Apr. 1, 2021

(30) Foreign Application Priority Data

Jun. 27, 2017   (DE) ..................... 10 2017 114 278.9

(51) Int. Cl.
*G08B 5/36*    (2006.01)
*G06F 3/14*    (2006.01)

(52) U.S. Cl.
CPC ....... *G08B 5/36* (2013.01); *G06F 3/14* (2013.01)

(58) Field of Classification Search
CPC .................................... G08B 5/36; G06F 3/14
(Continued)

(56) References Cited

U.S. PATENT DOCUMENTS

2015/0061974 A1* 3/2015 Kobayashi ............... G06F 3/14
345/8
2016/0110816 A1* 4/2016 Cardin ............... G02B 27/0172
705/4

(Continued)

FOREIGN PATENT DOCUMENTS

DE    10 2016 224 459 A    6/2017
EP         0 330 147 A2    8/1989
(Continued)

OTHER PUBLICATIONS

ISA European Patent Office, International Search Report Issued in Application No. PCT/EP2018/067258, dated Oct. 23, 2018, WIPO, 3 pages.

(Continued)

*Primary Examiner* — Omar Casillashernandez
(74) *Attorney, Agent, or Firm* — Alleman Hall Creasman & Tuttle LLP

(57) ABSTRACT

A display apparatus for an emergency service member for displaying information content of different information types from a guidance system is proposed. The display apparatus comprises a display, carriable by the emergency service member, having a plurality of visually distinguishable segments, with each of which at least one of the information types is associated, each segment being configured to visually output a current information content of the information type associated with the segment. Further, the display apparatus comprises an actuating unit, couplable to the guidance system, for actuating the display.

15 Claims, 3 Drawing Sheets

(58) Field of Classification Search
USPC .................................................. 340/815.67
See application file for complete search history.

(56) References Cited

U.S. PATENT DOCUMENTS

2017/0148116 A1*  5/2017  Grossman ........ G06Q 10/06311
2018/0013899 A1*  1/2018  Fukasawa .......... H04N 1/32635

FOREIGN PATENT DOCUMENTS

EP          1430350      * 10/2000
WO          02/31578 A1    4/2002

OTHER PUBLICATIONS

International Bureau of WIPO, International Preliminary Report on Patentability Issued in Application No. PCT/EP2018/067258, dated Jan. 9, 2020, WIPO, 13 pages.
Wikipedia (Führungssystem), <https://de.wikipedia.org/w/index.php?title=Barcodeleseger%C3%A4t&oldid=163718267>, Mar. 4, 2016, 3 pages.
Head-Mounted Display, Wikipedia (Head-Mounted Display), <https://de.wikipedia.org/w/index.phptitle=HeadMounted_Display&oldid=164028088>, Mar. 28, 2017, 5 pages.
Korean Intellectual Property Office, Office Action Issued in Application No. 10-2019-7037389, dated Nov. 25, 2020, Korea, 11 Pages.
IP Australia, Examination report No. 1 Issued in Application No. 2018294499, dated Jan. 27, 2021, 5 pages.
Canadian Intellectual Property Office, Office Action Issued in Application No. 3,064,823, dated Feb. 5, 2021, 6 pages.
European Patent Office, Office Action Issued in Application No. 18735257.0, dated Nov. 18, 2020, Germany, 6 pages.

* cited by examiner

DISPLAY APPARATUS FOR AN OPERATIONAL FORCE FOR DISPLAYING INFORMATION CONTENTS OF DIFFERENT INFORMATION TYPES OF A GUIDANCE SYSTEM

FIELD

The present invention relates to a display apparatus for an operational force for displaying information contents of different information types of a guidance system. Furthermore, the present invention relates to an arrangement having a guidance system for guiding a plurality of operational forces and having a plurality of display apparatuses.

BACKGROUND

For example, watches are known as display apparatuses, via which an information system or a guidance system can transmit information to a user of the watch. However, such a watch as an information receiver has the disadvantage that the user of the watch has to focus his attention at the watch for receiving information which is displayed by the watch. Thereby, in particular during an operation, the user can be distracted from other tasks or jobs. If the user is looking at the watch for receiving the information, also the response capacity of the user is reduced in a disadvantageous manner.

SUMMARY

Against this background, an object of the present invention is to provide an improved display apparatus for an operational force for displaying information of a guidance system.

According to a first aspect, a display apparatus for an operational force for displaying information contents of different information types of a guidance system is proposed. The display apparatus comprises a display wearable by the operational force and comprising a plurality of visually distinguishable segments, wherein to each of the segments at least one of the information types is assigned, wherein the respective segment is configured to visually output a current information content of the information type assigned to the segment. Furthermore, the display apparatus comprises a control unit couplable to the guidance system for controlling the display.

For example, the information types comprise one or more navigation points, one or more navigation areas, one or more threats for the operational force, predetermined targets and/or active assignments by the guidance system, a Red-Force-Tracking and/or a Blue-Force-Tracking. Preferably, different colours for the visual representation are assigned to the different information types by the segments.

In particular, the visually distinguishable segments are visually distinguishable for the operational force, that means for a human user. Preferably, the single segments of the display are individually controllable by the control unit.

For example, if an information type is a threat and the threat is located in the left area of the area of vision of the operational force, thus a segment which is arranged in the display in the left area which is assigned to the information type will glow red. Therefore, the operational force is signaled by the current information content of the red glowing of the segment, in particular in his peripheral field of vision, that there is a threat located to its left.

By using the present display apparatus, the effectivity of the operational force during an operation is significantly increased, because it is possible to immediately provide current information contents of different information types from the guidance system to the operational force by the display. By using the present display apparatus, the operational force is supported by peripheral perception at minimal restriction of the operational force. By using the proposed display apparatus, also the command process and the control process between the guidance system and the operational force can be accelerated.

The display of the display apparatus and the control unit of the display apparatus are inexpensive to produce, energy-efficient and have only a low weight for the operational force.

Preferably, the display is formed as a display wearable on the head of the operational force.

In particular, the control unit is couplable or connectable with the guidance system by one or more communication connections.

In particular, the control unit is couplable over at least two separated independent communication connections for establishing redundant communication paths with the guidance system. Examples of a communication standard usable for this purpose comprise GPRS, UMTS, LTE, WLAN, Bluetooth, TETRA radio, LoRa and Zigbee.

For example, the operational force is a soldier. Further examples for operational forces are firefighters, policemen, THW personnel and the like.

The guidance system can also be designated as control center or information system. The display can also be designated as segment display.

According to an embodiment, the control unit is configured to receive signals comprising the current information contents for the information types from the guidance system and to control the display by means of control commands generated in dependence on the received signals for visually outputting the current information contents.

The display apparatus can receive the current information contents for the different information types via the signals from the guidance system. Then, the control unit accordingly controls the display so that all received information contents are displayed to the user via the segments of the display, in particular in real time.

According to a further embodiment, the control unit is configured for assigning the information types to the segments of the display.

Advantageously, the control unit can control the assigning of the respective information type to the segments. For example, if the position of a threat changes relative to the operational force, thus the control unit will image the information-type threat according to this location change to a change of the assigned segment. That means, for example, if the threat moves from a left area relative to the operational force to a central area relative to the operational force, thus the control unit will change the segment which is assigned to the information type threat from a left area of the display to a central area of the display.

According to a further embodiment, the control unit is further configured to determine a representation type for the respective information type assigned to one of the segments.

For example, the control unit in this embodiment is configured to change a colour and/or a pulse duration of the segment in the context of the determination of the representation type. For example, if the information type represents a threat, the control unit can determine the colour red for the information type. Is the threat further approaching to the operational force, so the control unit can determine that the red glowing segment is additionally pulsed. With every further approaching of the threat to the operational force, the frequency of the pulsed red segment can be increased by the control unit.

According to a further embodiment, the control unit is configured to assign the information types to the segments in dependence on an external control command transmitted by the guidance system, a specific head orientation of the operational force and/or a detected position of the operational force.

For example, if the control unit receives an external control command for outputting an assignment or a command from the guidance system to the operational force, the control unit can determine, for the output of this command or this assignment, a specific segment as visual output. Furthermore, the control unit can determine the assignment of the information types to the segments in dependence on a change of the head orientation of the operational force. For example, as mentioned above, if a threat is located in the left area of vision of the operational force, a respective segment will glow red in the left area of the display. If the operational force then moves his head to the left and the threat does not change its position, the control unit will assign a segment in the central area of the display for the information type threat. Accordingly, the control unit can also change the assignment of the information types to the segments in dependence on a change of the position of the operational force, for example a satellite-determined position of the operational force.

According to a further embodiment, the display apparatus comprises a determination unit for determining the head orientation of the operational force, wherein the determination unit comprises a compass and/or a gyrometer.

According to a further embodiment, the display apparatus comprises a detection unit for detecting the position of the operational force. For example, the detection unit may comprise sensors like gyro sensors, acceleration sensors, step counter, altimeter or the like.

According to a further embodiment, the control unit is configured to assign a first information type and at least a second information type to a specific segment of the plurality of segments.

In particular, the control unit can also assign a plurality of information types to a specific segment. For example, the control unit can assign a segment not only to a Blue-Force-display (for example via the colour blue), but also a movement vector of the Blue-Force (for example via a displayed arrow in the segment).

According to a further embodiment, the plurality of visually distinguishable segments are arranged in a row.

When wearing the display apparatus by the operational force, the row of segments can particularly be arranged near to the eyes, for example, less above the eyes or less under the eyes, in a peripheral area of vision of the operational force. The arrangement of the row of segments in the peripheral area of vision of the operational force has the advantage that a high reaction possibility for the user is provided compared to a solution outside of the vision area. Further, the arrangement of the row of segments in the peripheral area of vision of the operational force has the advantage that a minimal restriction for the operational force is established compared to an arrangement in an active area of vision of the operational force.

According to a further embodiment, the plurality of visually distinguishable segments are arranged in a matrix.

In particular, the number of rows of the matrix is significantly lower than the number of the columns of the matrix so that the display is arrangeable with the segments arranged in a matrix in a peripheral area of the field of vision of the operational force.

According to a further embodiment, the row of segments is configured to image a horizontal field of vision of the operational force by means of the visual output of the information contents of the information types assigned to the segments.

According to a further embodiment, the display apparatus is formed as a mask wearable in front of the face of the operational force. Thereby, when wearing the mask by the operational force, the visually distinguishable segments are arranged in a peripheral field of vision of the operational force.

In particular, the mask can be connected via belts with two headphones for the ears of the operational force and connected via at least a further belt for tensioning the headphones and the mask over the head. Furthermore, the mask can comprise an embedded microphone so that the operational force can communicate via voice via the microphone and the headphones with the guidance system.

Thereby, when wearing the mask by the operational force, the visually distinguishable segments are arranged such that they are exclusively arranged in the peripheral field of vision of the operational force and particularly not in the active field of vision of the operational force.

Thus, the segments are preferably in the peripheral area of vision exclusively and not in the active vision area, that means that the user can recognize them but the segments and their display only minimally disturb the operational force.

According to a further embodiment, the display apparatus is formed as glasses or a glasses extension wearable by the operational force, wherein, when wearing the glasses or glasses extension by the operational force, the visually distinguishable segments are arranged in a peripheral field of vision of the operational force.

For example, the segments may be arranged above the lenses of the glasses. For example, as glasses extension, the segments may be pluggable onto glasses or may be connected to a frame which is slidable in x-direction, in y-direction and/or in z-direction.

According to a further embodiment, the glasses or the glasses extension are/is formed such that an orientation of the segments can be set in x-direction, in y-direction and/or in z-direction.

According to a further embodiment, the visually distinguishable segments are arranged ring-shaped distributed. In particular, the segments form a ring. Preferably, the segments of the displays are bendable.

According to a further embodiment, the ring-shaped distributed arranged segments are integrated in an aiming system of a weapon or in an aiming telescope.

According to a further embodiment, the ring-shaped distributed arranged segments are arranged in an investigation means or in binoculars.

According to a further embodiment, a number of segments of the plurality of visually distinguishable segments is configured to image an area outside the visual image of the operational force, in particular an area behind the operational force, by means of the visual output of the information contents of the information types assigned to the number of segments.

This makes it possible to assign to specific segments, namely the segments of said number, areas outside the area of vision of the operational force and thus to make areas visible for the operational force via these segments which he actually may not see without a turning of his body and/or his head. In particular, these areas are such areas which are behind the operational force.

According to a further embodiment, each segment of the two outer segments of the plurality of visually distinguishable segments is configured to image a specific area outside the visual image of the operational force, in particular an area behind the operational force, by means of the visual output of the information contents of the information types assigned to the respective segment.

For example, the left outer segment can be assigned to a left area behind the operational force, whereas a right area behind the operational force can be assigned to the right outer segment. Thus, via the outer segments, not only areas outside of the area of vision of the operational force, in particular behind him, can be made visible for the operational force, but he can even differentially perceive different areas outside of its vision area. For example, that means that an enemy within the left area behind the operational force is made visible for the operational force by the left outer segment, whereas an enemy in the right area behind the operational force is made visible for the operational force by the right outer segment of the display apparatus.

According to a further embodiment, the plurality of visually distinguishable segments are arranged at a helmet for the operational force or integrated in the helmet.

According to a further embodiment, the display apparatus comprises a control apparatus. Preferably, the control apparatus comprises an interface device or a data interface which is at least configured for coupling the display. Furthermore, the interface device may comprise one or more interfaces, for example a USB interface and/or a Bluetooth interface, which are configured for coupling external devices or sensors.

Additionally, the control apparatus may comprise a data processing device such as a microprocessor which is, for example, integrated in the control unit.

Moreover, the control apparatus preferably comprises a communication device for data communication with at least the guidance system. By the aforesaid interface device or data interface, one or more sensors can be connected. Examples for such sensors comprise a gyroscope, a light sensor, a microphone, an ambient noise cancellation and/or a compass.

The respective unit, e.g. the control unit, may be implemented in hardware and/or in software. If said unit is implemented in hardware, it may be embodied as a device or as a part of a device, e.g. as a computer or as a processor. If said unit is implemented in software it may be embodied as a computer program product, as a function, as a routine, as a part of a program code or as an executable object.

A computer program product, such as a computer program means, may be provided or delivered as a memory card, USB stick, CD-ROM, DVD or also as a file which may be downloaded from a server in a network. For example, in a wireless communication network, this can be done by transferring a corresponding file using the computer program product or the computer program means.

According to a second aspect, an arrangement having a guidance system for guiding a plurality of operational forces and having a plurality of display apparatuses is proposed, wherein each of the display apparatuses is assigned to one of the operational forces. The respective display apparatus is formed according to the first aspect or according to an embodiment of the first aspect.

Further possible implementations of the present invention also comprise combinations—that are not explicitly mentioned herein—of features or embodiments described above or below with regard to the embodiments. Thereby, the skilled person may also add isolated aspects as improvements or additions to the respective basic form of the present invention.

Further advantageous embodiments and aspects of the present invention are subject-matter of the dependent claims as well as the below described embodiments of the present invention. Furthermore, with reference to the attached drawings, the present invention is discussed in more detail on the basis of preferred embodiments.

BRIEF DESCRIPTION OF THE DRAWINGS

Furthermore, with reference to the attached drawings, the present invention is discussed in more detail on the basis of preferred embodiments.

DETAILED DESCRIPTION

Figure 1:
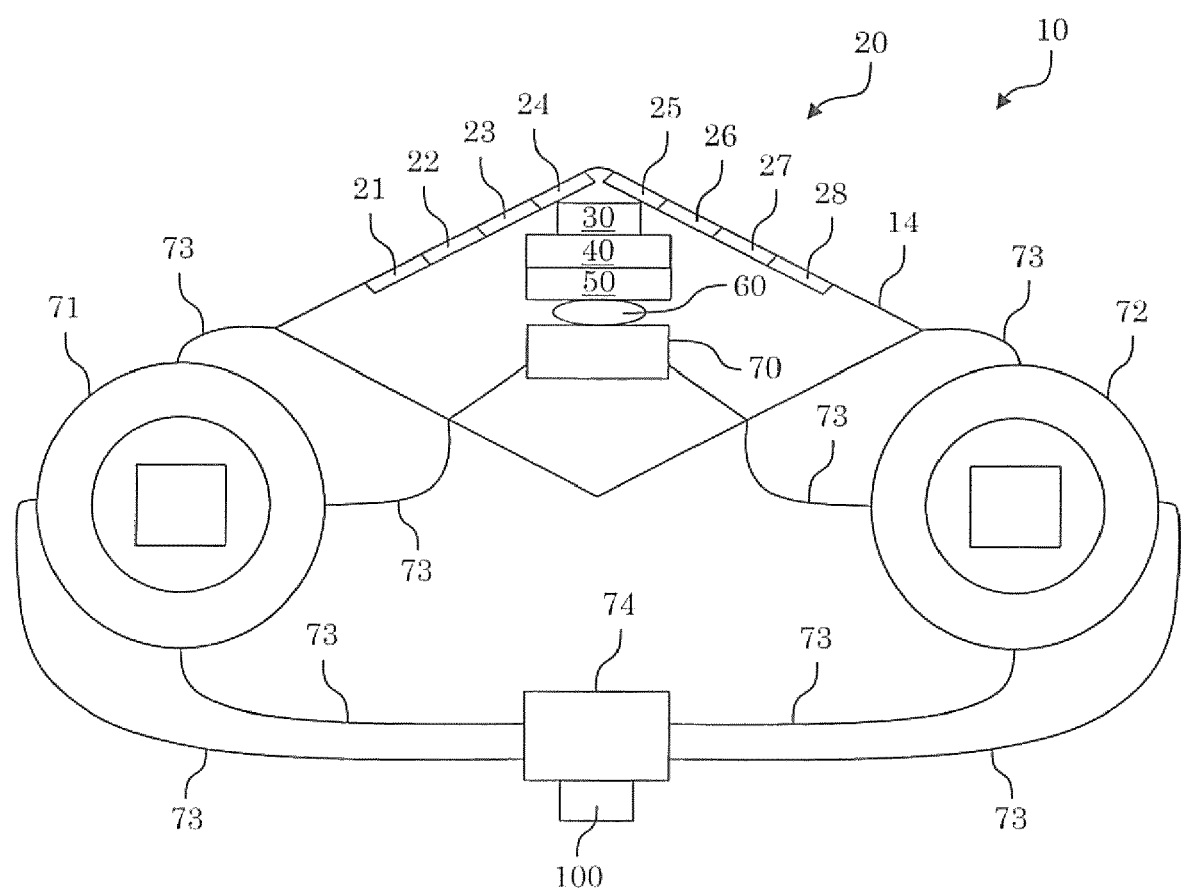
FIG. 1 shows a schematic block diagram of a first embodiment of a display apparatus for an operational force.

In the figures, the same or functionally identical elements have been given the same reference numerals, unless otherwise indicated.

In FIG. 1, a schematic block diagram of a first embodiment of a display apparatus 10 for an operational force is shown.

Figure 6:
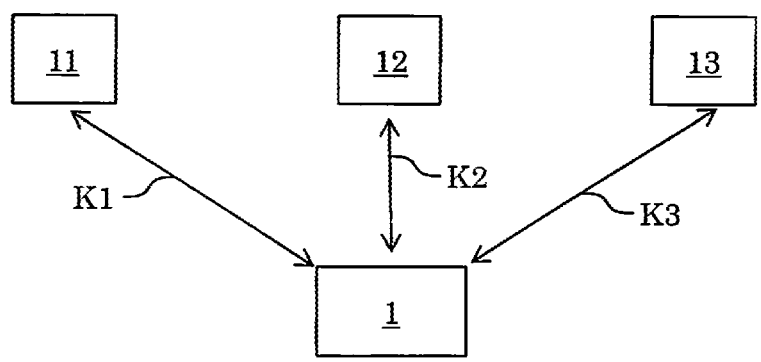
FIG. 6 shows a schematic block diagram of an embodiment of an arrangement having a guidance system for guiding a plurality of operational forces and having a plurality of display apparatuses.

The display apparatus 10 of FIG. 1 is formed as a textile mask 14 wearable in front of the face of the operational force, which is configured for displaying information contents of different information types of a guidance system 1 (see FIG. 6). For this purpose, the mask 14 of FIG. 1 has a display 20 which comprises a plurality of visually distinguishable segments 21-28. When wearing the mask 14 by the operational force, the visually distinguishable segments 21-28 of the display 20 are arranged in a peripheral field of vision of the operational force. In particular, the segments 21-28 are individually controllable. Each of the segments 21-28 is assigned to at least one of the information types. The respective segment 21-28 is configured for the visual output of a current information content of the information type assigned to the segment 21-28.

The mask 14 of FIG. 1 further comprises a control unit 30 which is couplable with the guidance system 1 (see FIG. 6) for interchanging of data and which is configured for controlling the display 20. In particular, for this purpose, the control unit 30 is configured to receive signals, for example radio signals, comprising the current information contents for the different information types from the guidance system 1 and configured to control the display 20 by means of control commands generated in dependence on the received signals for visually outputting the current information contents.

For example, the control unit 30 is part of a control apparatus, such as a microprocessor. In particular, the control unit 30 is wrapped in the textile of the mask 14. The same is true for the hereinafter discussed units 40-70.

Furthermore, the control unit 30 can also be configured to assign the information types to the segments 21-28. In particular, this assignment can take place dynamically, for example in dependence on a position of the operational force and/or a head orientation of the operational force.

Further, the control unit 30 is configured to determine a representation type for the respective information type by the assigned segment 21-28. For example, the representation type comprises the colour of the representation and/or a pulse frequency of the representation.

Furthermore, the mask 14 comprises a determination unit 40 and a detection unit 50. The determination unit 40 is configured to determine the head orientation of the operational force. For example, the determination unit 40 comprises a compass and/or a gyrometer. The detection unit 50 is configured to detect the position of the operational force. For example, the detection unit 50 comprises a GPS receiver. Furthermore, the mask 14 comprises an air passage 60 as well as a microphone 70.

Moreover, the mask 14 is preferably connected via a number of belts 73 with two headphones 71, 72 for the ears of the operational force and connected via further belts 73 for tensioning the headphones 71, 72 and the mask 14 over the head of the operational force. The operational force can communicate via voice using the microphone 70 and the headphones 71, 72 with the guidance system 1. When wearing the mask 14, the segments 21-28 of the display 20 are arranged such that they are exclusively arranged in the peripheral field of vision of the operational force and particularly not in the active field of vision of the operational force.

For connecting the belts 73 at the back of the head of the operational force, a connection device 74, for example a buckle, is provided. At the connection device 74, a data interface 100 can be provided. For example, the data interface is a USB interface.

Figure 2:
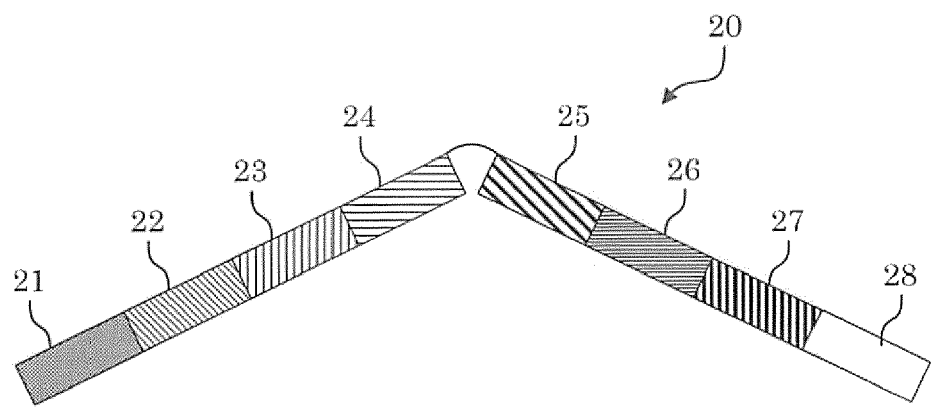
FIG. 2 shows an enlarged view of the display of the display apparatus according to FIG. 1.

In FIG. 2, an enlarged view of the display 20 of the display apparatus 10 according to FIG. 1 is shown. FIG. 2 shows that the segments 21-27 have different hatchings. Each one of the different hatchings represents a different information type. In the example of the FIG. 2, the segment 28 is provided for the displaying of external commands of the guidance system 1 for the operational force and is provided in FIG. 2 without a hatching.

The segments 21-28 are arranged in a row which can also have an edge or a curve. Preferably, the row of the segments 21-28 forms a horizontal field of vision of the operational force by the visual output of the information contents of the information types assigned to the respective segments 21-28.

Figure 3:
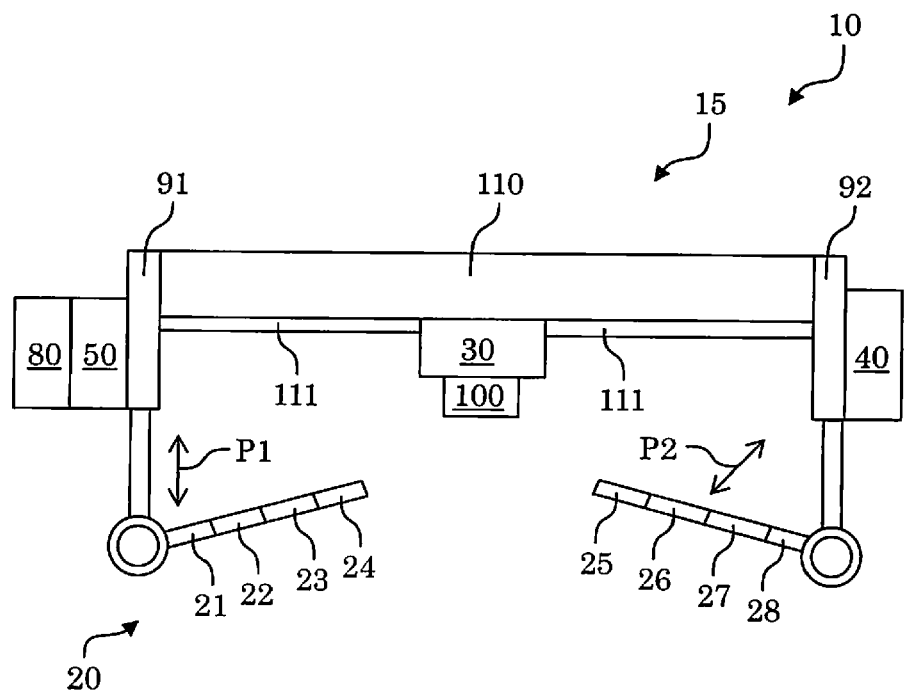
FIG. 3 shows a schematic block diagram of a second embodiment of a display apparatus for an operational force.

FIG. 3 shows a schematic block diagram of a second embodiment of a display apparatus 10 for an operational force. The display apparatus 10 of FIG. 3 is formed as glasses 15 for the operational force. The display 20 of the display apparatus of FIG. 3 comprises two rows of segments 21-24 and 25-28. Regarding the features and properties of the segments 21-28 of the display 20 of FIG. 3, reference is made to the features and properties of the segments 21-28 of FIG. 1.

The glasses 15 comprises a fixing device 110 for fixing the glasses 15. At the fixing device 110, stabilizing plates 91, 92 for wearing the two rows of segments 21-24 and 25-28 are arranged. The arrows P1 and P2 show a setting possibility of the rows of segments 21-24 and 25-28 in y-direction and in z-direction. Furthermore, the fixing device 110 preferably comprises a setting possibility in x-direction. The control unit 30 of the display apparatus 10 of FIG. 3 is coupled with a data interface 100 and connectable via communication connections 111 with a determination unit 40, a detection unit 50 and a light sensor 80.

Figure 4:
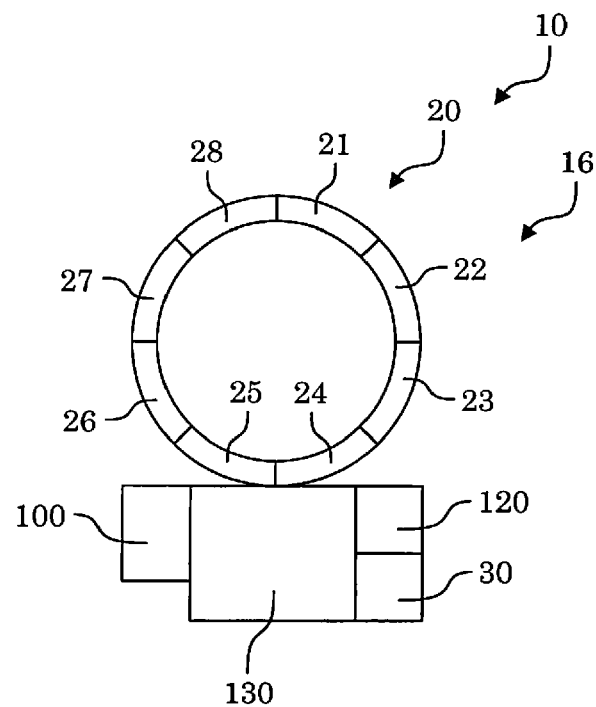
FIG. 4 shows a schematic block diagram of a third embodiment of a display apparatus for an operational force.

FIG. 4 shows a schematic block diagram of a third embodiment of a display apparatus 10 for an operational force. The display apparatus 10 of FIG. 4 is formed as an aiming system 16 for a weapon. The display 20 with the visually distinguishable segments 21-28 of the display apparatus 10 in FIG. 4 is formed ring-shaped. Thus, for example, the ring of segments 21-28 can be integrated in an aiming telescope. Regarding the features and properties of the segments 21-28 of the display 20 of FIG. 4, reference is made to the features and properties of the segments 21-28 of FIG. 1.

The ring-shaped display 20 of FIG. 4 is mounted on a weapon part 130. For example, at the weapon part 130, the evaluation unit 30, a data interface 100 and a power supply device 120, for example an accumulator, are arranged. For example, further devices which can also be arranged at the weapon part 130 are described with respect to FIGS. 1 and 3 and comprise, for example, a detection unit 50 and a communication apparatus for communication with the guidance system 1.

Figure 5:
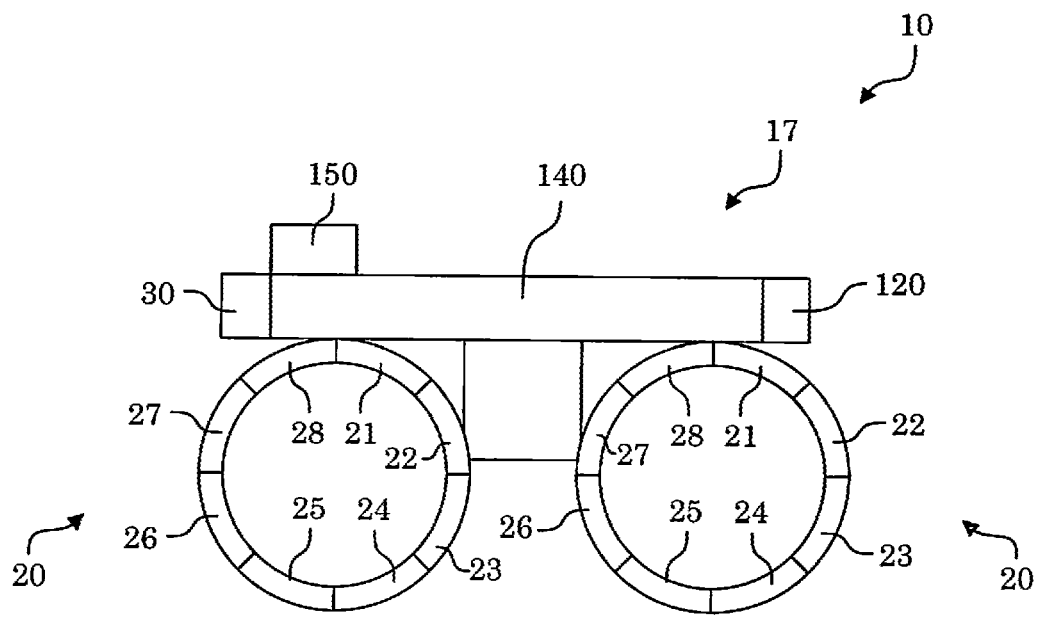
FIG. 5 shows a schematic block diagram of a fourth embodiment of a display apparatus for an operational force.

FIG. 5 shows a schematic block diagram of a fourth embodiment of the display apparatus 10 for an operational force. The display apparatus 10 of FIG. 5 comprises two rings of segments 21-28 for the two eyes of the operational force. Regarding the features and properties of the segments 21-28 of the display 20 of the FIG. 5, reference is made to the features and properties of the segments 21-28 of FIG. 1.

The two rings of segments 21-28 are fixed at a support part 140. For example, at the support part 140, the control unit 30, a power supply device 120 and a communication device 150 for communication with the guidance system 1 are provided. For example, further units which can be fixed to the support part 140 arise from FIGS. 1, 3 and 4.

Further embodiments for display apparatuses 10 arise from the combination of the embodiments of the FIGS. 1, 3, 4 and 5.

FIG. 6 shows a schematic block diagram of an embodiment of an arrangement having a guidance system 1 for guiding a plurality of operational forces and having a plurality of display apparatuses 11, 12, 13.

The guidance system 1 is couplable via communication connections K1, K2, K3 with the display apparatuses 11, 12 and 13. The respective display apparatus 11, 12, 13 is assigned to a respective operational force. For example, the respective communication connection K1, K2, K3, for example the communication connection K1 between the guidance system 1 and the display apparatus 11, is formed as a radio interface. For example, the respective display apparatus 11, 12, 13 is formed as one of the display apparatuses 10 of the FIG. 1, 3, 4 or 5.

Although the present invention has been described in accordance with preferred embodiments, it is obvious for the person skilled in the art that modifications are possible in all embodiments.

LIST OF REFERENCE NUMBERS 1 guidance system
10 display apparatus
11 display apparatus 12 display apparatus
13 display apparatus
14 mask
15 glasses
16 aiming system
17 binoculars
20 display
21 segment
22 segment
23 segment
24 segment
25 segment
26 segment
27 segment
28 segment
30 control unit
40 determination unit
50 detection unit
60 air passage
70 microphone
71 head phone
72 head phone
73 belt
74 connection device
80 light sensor
91 stabilization plate
92 stabilization plate
100 data interface
110 fixing device
120 power supply device
130 weapon part
140 support part
150 communication device
P1 setting in y-direction
P2 setting in x-direction
K1 communication connection
K2 communication connection
K3 communication connection

The invention claimed is:

1. A display apparatus for an operational force for displaying information contents of different information types of a guidance system, comprising:
a display wearable by the operational force and comprising a plurality of visually distinguishable segments, wherein to each of the segments at least one of the information types is assigned, wherein the respective segment is configured to visually output a current information content of the information type assigned to the segment, and
a control unit couplable to the guidance system for controlling the display,
wherein the display apparatus is formed as a mask wearable in front of the face of the operational force or the display apparatus is formed as glasses or a glasses extension wearable by the operational force,
wherein, when the display apparatus is worn, the visually distinguishable segments are arranged in a peripheral field of vision of the operational force, and
wherein a number of segments of the plurality of visually distinguishable segments is configured to image an area outside the visual image of the operational force by means of the visual output of the information contents of the information types assigned to the number of segments.

2. The display apparatus according to claim 1, wherein the control unit is configured to receive signals comprising the current information contents for the information types from the guidance system and to control the display by means of control commands generated in dependence on the received signals for visually outputting the current information contents.

3. The display apparatus according to claim 1, wherein the control unit is configured for assigning the information types to the segments of the display.

4. The display apparatus according to claim 3, wherein the control unit is further configured to determine a representation type for the respective information type assigned to one of the segments.

5. The display apparatus according to claim 1, wherein the control unit is configured to assign the information types to the segments in dependence on an external control command transmitted by the guidance system, a specific head orientation of the operational force and/or a detected position of the operational force.

6. The display apparatus according to claim 5, further comprising:
a determination unit for determining the head orientation of the operational force, wherein the determination unit comprises a compass and/or a gyrometer, and
a detection unit for detecting the position of the operational force.

7. The display apparatus according to claim 1, wherein the control unit is configured to assign a first information type and at least a second information type to a specific segment of the plurality of segments.

8. The display apparatus according to claim 1, wherein the plurality of visually distinguishable segments are arranged in a row.

9. The display apparatus according to claim 8, wherein the row of segments is configured to image a horizontal visual image of the operational force by means of the visual output of the information contents of the information types assigned to the segments.

10. The display apparatus according to claim 1, wherein the display apparatus is formed as the glasses or the glasses extension, and
the segments are configured to be adjustable in orientation in an x-direction, a y-direction, and/or a z-direction.

11. The display apparatus according to claim 1,
wherein the area outside the visual image of the operational force is an area behind the operational force.

12. The display apparatus according to claim 1, wherein each segment of two outer segments of the plurality of visually distinguishable segments is configured to image a specific area outside the visual image of the operational force by means of the visual output of the information contents of the information types assigned to the respective segment.

13. The display apparatus according to claim 1, wherein the plurality of visually distinguishable segments are arranged at a helmet for the operational force or integrated in the helmet.

14. An arrangement having a guidance system for guiding a plurality of operational forces and having a plurality of display apparatuses according to claim 1, wherein each of the display apparatuses is assignable to one of the operational forces.

15. The display apparatus according to claim 12,
wherein the area outside the visual image of the operational force is an area behind the operational force.

* * * * *